United States Patent [19]

Thormann et al.

[11] 4,381,608

[45] May 3, 1983

[54] METHOD FOR INTERPOLATING BETWEEN CARTESIAN AND ROTARY COORDINATES IN MACHINES

[75] Inventors: Harald Thormann, Neunkirchen; Horst Gose, Erlangen-Dechsendorf; Arnold Weser, Augsburg, all of Fed. Rep. of Germany

[73] Assignee: Siemens Aktiengesellschaft, Munich, Fed. Rep. of Germany

[21] Appl. No.: 290,228

[22] Filed: Aug. 5, 1981

[30] Foreign Application Priority Data

Sep. 3, 1980 [DE] Fed. Rep. of Germany ........ 3033202

[51] Int. Cl.³ .............................................. B43L 5/00
[52] U.S. Cl. .................................... 33/1 M; 33/1 MP
[58] Field of Search .................... 33/1 M, 1 R, 1 MP

[56] References Cited

U.S. PATENT DOCUMENTS 3,696,397 10/1972 Raser .................................. 33/1 M
4,211,512 7/1980 Zankl .................................. 33/1 M

OTHER PUBLICATIONS

"System for Converting Rectangular Coordinate Signals into Polar Coordinate Signals", Technical Digest No. 16 (Western Electric) 10/1969.

Primary Examiner—Willis Little
Attorney, Agent, or Firm—Kenyon & Kenyon

[57] ABSTRACT

A method for interpolating between a Cartesian coordinate axis and an axis of rotation of a numerically controlled machine. The axis of rotation of the numerically control machine is treated, from a control standpoint, as a linear Cartesian axis. Computing circuitry is provided for transforming and retransforming the coordinate data. In this manner, the entering of data into a machine control system is simplified.

2 Claims, 4 Drawing Figures

METHOD FOR INTERPOLATING BETWEEN CARTESIAN AND ROTARY COORDINATES IN MACHINES

BACKGROUND OF THE INVENTION

This invention relates generally to interpolation methods, and more particularly, to a method for interpolating between a Cartesian coordinate axis system and an axis of rotation, and to the control of the axis of rotation, in numerically controlled machines.

A variety of designs for numerically controlled machines wherein interpolation in Cartesian coordinates is performed for track control are described in Siemens-Zeitschrift 1970, Supplement "Numerical Controls", FIG. 5, pages 7 and 52 to 62; and Siemens-Zeitschrift 1975, pages 346 to 350. Some known machine systems are provided with axes of rotation in addition to Cartesian feed axes. Such a combination of axial motion along Cartesian coordinates and a rotary axis permits special curves to be machined, illustratively helices, involutes, and others. It is a problem with such systems, however, that interpolation between the Cartesian and rotary coordinates is difficult, because the coupling of the two motions can be simply described by only a system of equations which is not easily adaptable to interpolation.

It is, therefore, an object of this invention to provide a method by which interpolation between rotary and Cartesian axes can be performed in a relatively simple manner, and the rotary axis can be accordingly controlled.

SUMMARY OF THE INVENTION

The foregoing and other objects are achieved by this invention which provides that the paths which are to be travelled by machine parts along the rotary axis and at a predetermined radius serve for interpolation purposes within the control system as paths which are transformed into a Cartesian coordinate axis. Such a coordinate transformation takes into consideration the actual radius and the distances to be traversed along the Cartesian coordinate axis. The coordinates which are obtained for the transformed rotary axis are transformed back into coordinates suitable for controlling the axis of rotation, these coordinates having values which are related to the predetermined radius of the rotary axis.

In one advantageous embodiment of the invention, the travelling distances along the rotary axis are entered into the control system in the form of positioning data related to the predetermined radius. The data is transformed in the control into the actual positioning data. However, it is also possible to enter the transformed distances, i.e., the distances which are to be actually travelled at a workpiece, directly into the control system, and to interpolate with such data.

BRIEF DESCRIPTION OF THE DRAWING

Comprehension of the invention is facilitated by reading the following detailed description in conjunction with the annexed drawings, in which.

DETAILED DESCRIPTION

Figure 1:
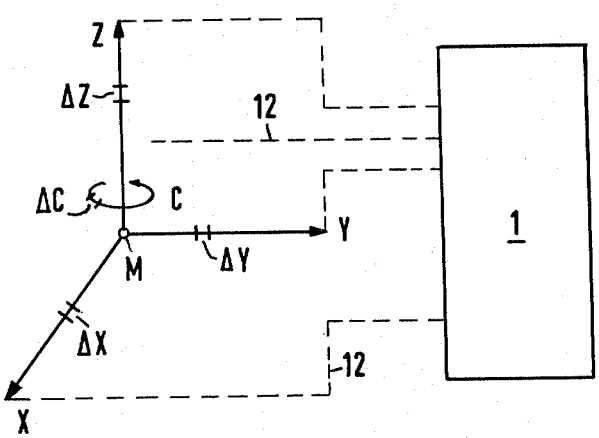
FIG. 1 is a representation of coordinate axes and a function block which are useful in explaining the principles of numerical machine control.

FIG. 1 illustrates the manner in which motion along individual Cartesian coordinate axes X, Y, and Z is controlled by numerical control system 1. Numerical control systems of the type useful in practicing the inventive method herein are known. The Cartesian coordinates are provided with an axis of rotation C. A plurality of dashed lines 12 indicate that the individual coordinate axes are controlled by numerical control system 1.

From a control engineering standpoint, axis of rotation C having a center of rotation M is treated as a linear Cartesian axis, so that:

$$\Delta X = \Delta Y = \Delta Z = \Delta C = R_o \Delta \rho$$

where, $\Delta X$, $\Delta Y$, and $\Delta Z$ are interpolation and programming units for the Cartesian axes; $\Delta C$ is the measurement regulating and control unit for axis of Rotation C; $R_o$ is the unit (predetermined) radius at which the transformation relationship is valid and accurate; and $\Delta \rho$ is the angle measuring unit of the measuring system used for the axis of rotation, which agrees numerically with $\Delta C$.

Figure 2:
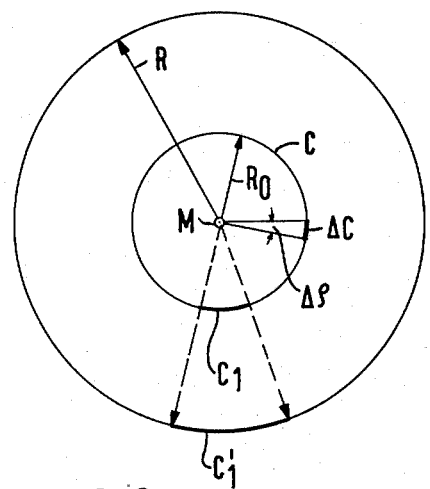
FIG. 2 illustrates the transformation relationship for a rotary axis.

FIG. 2 shows that a distance of travel $C_1$ on axis of rotation C corresponds in degrees with the length of an arc $C_1'$, in millimeters, taking into consideration the actual radius R which is the actual distance from the center of rotation. Within the control system, interpolation occurs in a transformed coordinate system which must consider the actual radius R from center M. In this transformation, Cartesian coordinates X, Y, and Z remain unchanged, while axis of rotation C is changed according to the transformation:

$$C' = C (R/R_o) \quad (1)$$

Figure 3:
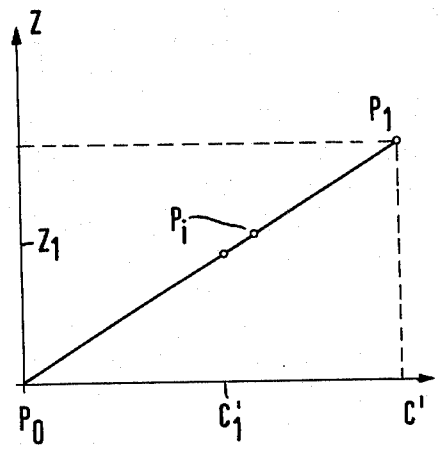
FIG. 3 shows a straight-line interpolation between a rotary axis and a Cartesian coordinate for the purpose of defining a helix.

FIG. 3 shows the manner in which interpolation is performed internal to the control system between Cartesian coordinates, illustratively Z and transformed axis of rotation C'. This is performed as though the axis of rotation were a Cartesian coordinate. In the straight-line interpolation shown here between points $P_o$ and $P_i$ in the Z-C' plane, interpolation values $P_i$ are obtained with distances $C'_1$ and $Z_1$, which produce a helix on a cylindrical surface. The values produced along the C'-axis must transformed back into corresponding values of the C-axis so that the interpolation values produced in the C'-axis can be used for achieving control in the axis of rotation C. Such transformation is performed in accordance with:

$$C = C' (R_o/R) \quad (2)$$

The simultaneous feed along the Z and C axes, in accordance with the illustrative embodiment of FIG. 3, enable a helix to be produced on a cylindrical surface.

Figure 4:
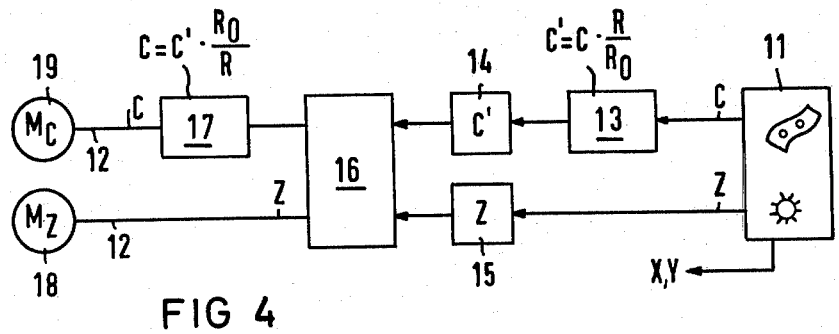
FIG. 4 is a block and line representation of a system for implementing the inventive method.

FIG. 4 is a block and line representation of an embodiment of the invention. An input device 11 enters the value of predetermined radius $R_o$ for the C axis of rotation, illustratively $C_1$. The C values are transformed into C' values in a transformation computing stage 13 in accordance with equation (1) above, which values are stored in a memory 14. Similarly, a Z value is stored in a memory 15. An interpolator 16 is coupled to memories 14 and 15. Interpolator 16 interpolates the track curves between points $P_o$ and $P_1$ from the C and Z values, illustratively $C_1$ and $Z_1$. The values which are produced in the process corresponding to transformed coordinate axis C' are transformed back into coordinate values of axis of rotation C by a further coordinate transformation stage 17 which operates in accordance with equation (2). The retransformed values are conducted as control data to a drive motor 19 for the axis of rotation. The control values for the Cartesian Z axis arrive at a drive 18 for movement along the Z axis.

If the circuit of FIG. 4 is designed to produce a trajectory according to FIG. 3, a constant travel velocity is achieved along the helix. The accuracy along the axis of rotation is independent of the velocity along the trajectory.

As can be seen, not only is interpolation possible in the C-Z axis, but also interpolation in the R-C plane, i.e., between coordinates X, Y, and C.

For the sake of simplification the inventive method was described with reference to a circuit embodiment constructed from individual elements. However, it is equally possible to replace interpolators, illustratively of the hard-wired type, with corresponding computers, without deviating from the principles of the interpolation.

Although the invention has been described in terms of specific embodiments and applications, it is to be understood that persons skilled in the pertinent art, in light of this teaching can generate additional embodiments without departing from the scope of the invention. Accordingly, it is to be understood that the drawings and descriptions in this disclosure are illustrative of the principles of the invention and should not be construed to limit the scope therof.

What is claimed is:

1. A method for interpolating between Cartesian coordinate axes and an axis of rotation, and for controlling the axis of rotation of a numerically controlled machine, the numerically controlled machine being of the type having a control system for interpolating in Cartesian coordinates, the method comprising the steps of:

entering distances to be travelled along the axis of rotation at a predetermined radius into the control system, the axis of rotation being considered as a Cartesian coordinate axis;

entering into the control system an actual radius for interpolation and at least one distance to be travelled along a Cartesian coordinate axis; and transforming coordinate data produced by the control system into values corresponding to the predetermined radius of the axis of rotation, so as to permit control of said axis of rotation.

2. The method of claim 1 wherein there is provided the further step of entering positioning data related to the predetermined radius into the control system.

* * * * *